(12) United States Patent
Chuang

(10) Patent No.: US 7,645,045 B2
(45) Date of Patent: Jan. 12, 2010

(54) TRIPOD FOR CAMERA

(75) Inventor: Meng-Hsien Chuang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,236

(22) Filed: Dec. 18, 2007

(65) Prior Publication Data

US 2009/0141473 A1 Jun. 4, 2009

(30) Foreign Application Priority Data

Dec. 4, 2007 (CN) .......................... 2007 1 0202846

(51) Int. Cl.
*G03B 15/02* (2006.01)

(52) U.S. Cl. ...................... 362/9; 362/8; 362/249.01; 362/249.02

(58) Field of Classification Search ...................... 362/8, 362/102, 110, 198, 190, 240, 249, 9; 248/163.1, 248/177.1
See application file for complete search history.

(56) References Cited

U.S. PATENT DOCUMENTS

| | | | | |
|---|---|---|---|---|
| 5,404,280 A | * | 4/1995 | Greek et al. ................. | 362/198 |
| 6,899,441 B2 | * | 5/2005 | Chen ........................... | 362/102 |
| 7,011,423 B2 | * | 3/2006 | Chen ........................... | 362/102 |
| 2006/0175977 A1 | * | 8/2006 | Deursen et al. ........... | 315/185 S |

FOREIGN PATENT DOCUMENTS

| | | |
|---|---|---|
| CN | 200947153 Y | 9/2007 |
| JP | 200681282 A | 3/2006 |

* cited by examiner

*Primary Examiner*—John A Ward
(74) *Attorney, Agent, or Firm*—Zhigang Ma

(57) ABSTRACT

A tripod adapted for supporting a camera comprises a central support and three legs having uppers ends pivotally connected to the central support. At least one of the legs has a plurality of light-emitting components mounted thereon.

2 Claims, 3 Drawing Sheets

TRIPOD FOR CAMERA

BACKGROUND OF THE INVENTION

1. Field of the Invention

The present invention relates to a tripod, and particularly to a tripod for a camera with illuminating components provided thereon.

2. Description of Related Art

Sometimes, in order to capture pictures under the best lighting conditions and visualization effects, a camera needs additional support from a tripod and a light source, such as a flash. However, it is inconvenient for the user to carry such supporting equipments, especially when traveling outdoors.

What is needed, therefore, is a new tripod capable of providing illumination therefrom.

SUMMARY OF THE INVENTION

A tripod adapt for supporting a camera comprises a central support portion and three legs having uppers ends pivotally connected to the central support portion. At least one of the legs has a plurality of light-emitting components mounted thereon.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
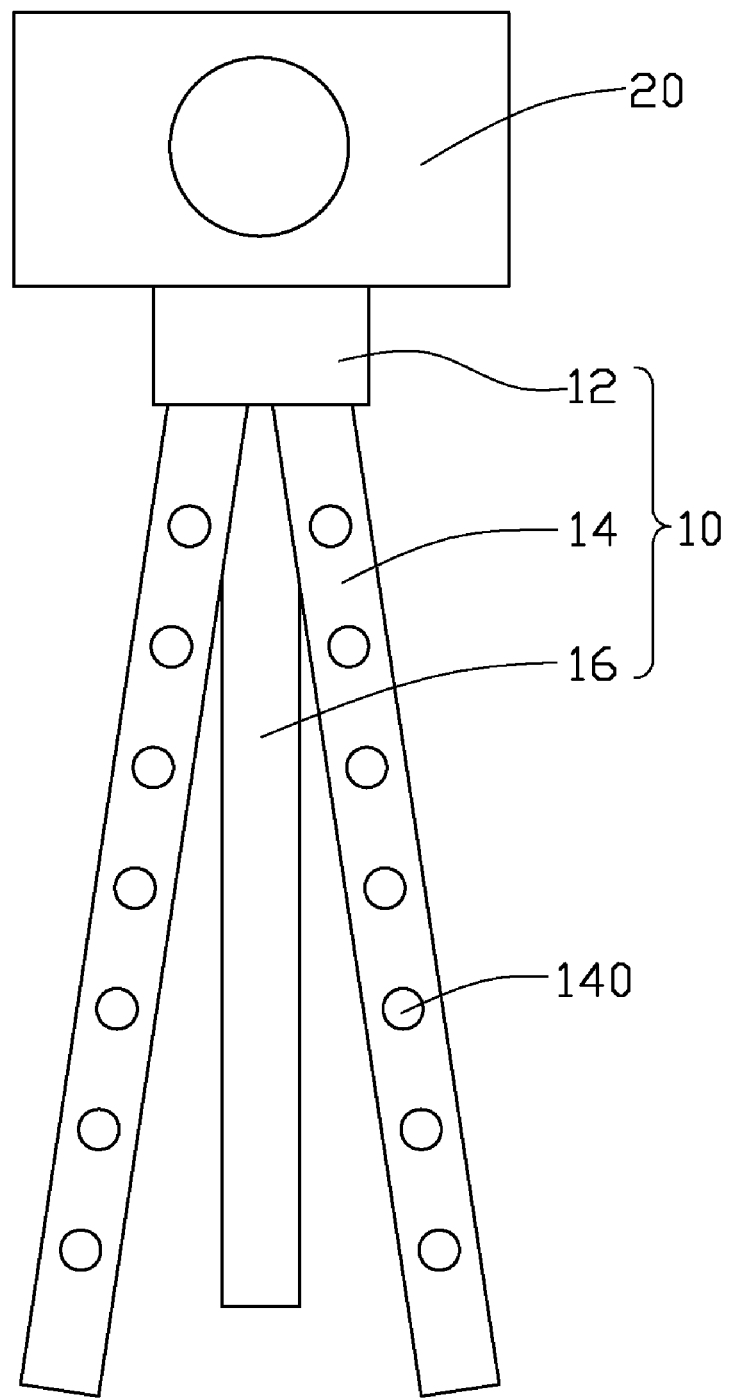
FIG. 1 is an elevation of a tripod in accordance with a present embodiment of the present invention, on which a camera is mounted.
Figure 2:
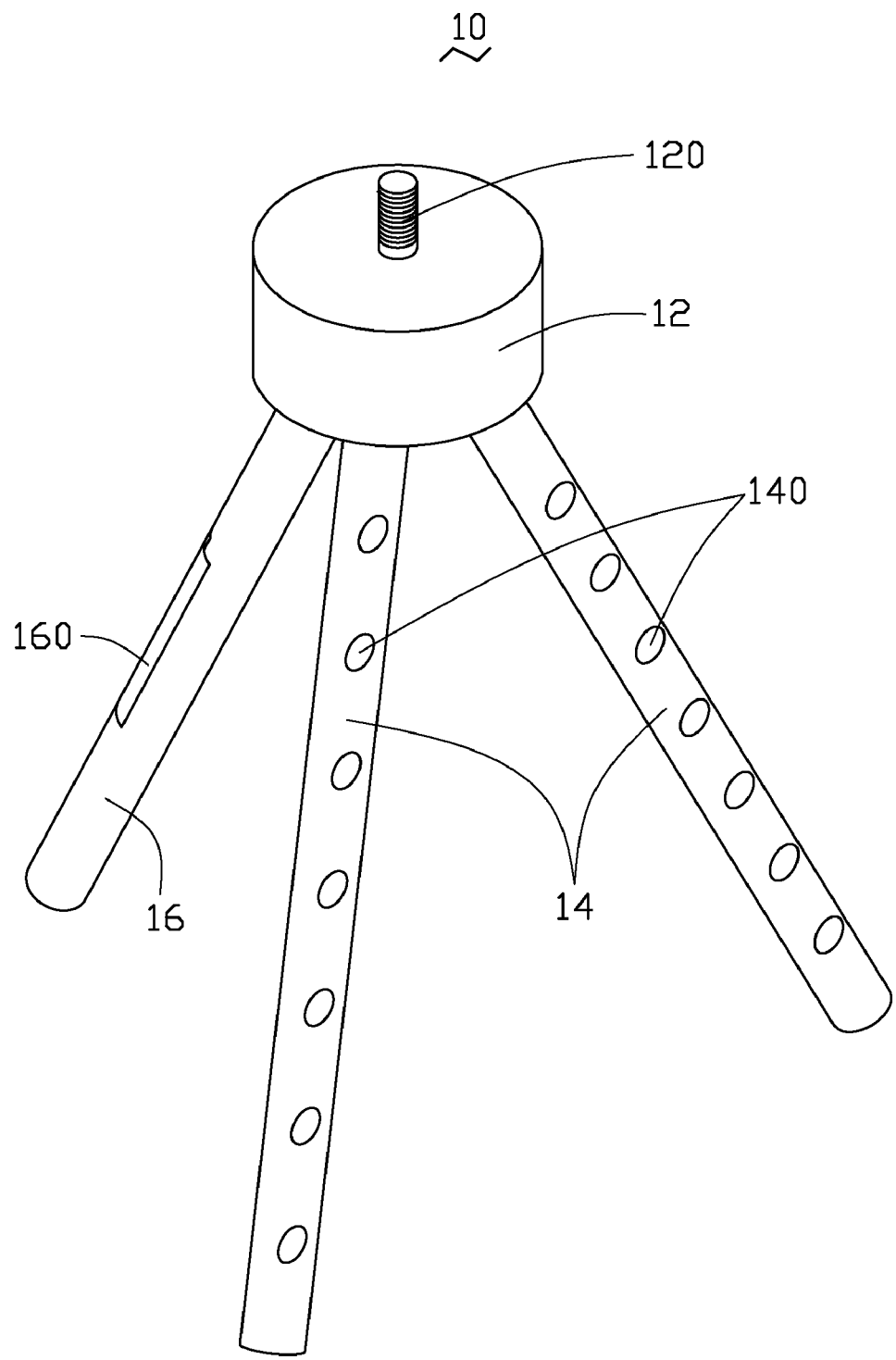
FIG. 2 is a another perspective view of the tripod in FIG. 1.

Referring to FIG. 1 and FIG. 2, a tripod 10 in accordance with a present embodiment of the present invention, is configured to support a camera 20. The tripod 10 comprises a central support portion 12 on which the camera 20 is supported, two first legs 14 and a second leg 16.

The central support 12 is substantially cylinder-shaped and has a fixing post 120 extending upwardly from a centre thereof. The fixing post 120 is configured for locking the camera 20 on the central support 12 and conventionally has screw threads formed on circumference thereof for screwing into a standardized hole (not shown) in a bottom of the camera 20.

Figure 3:
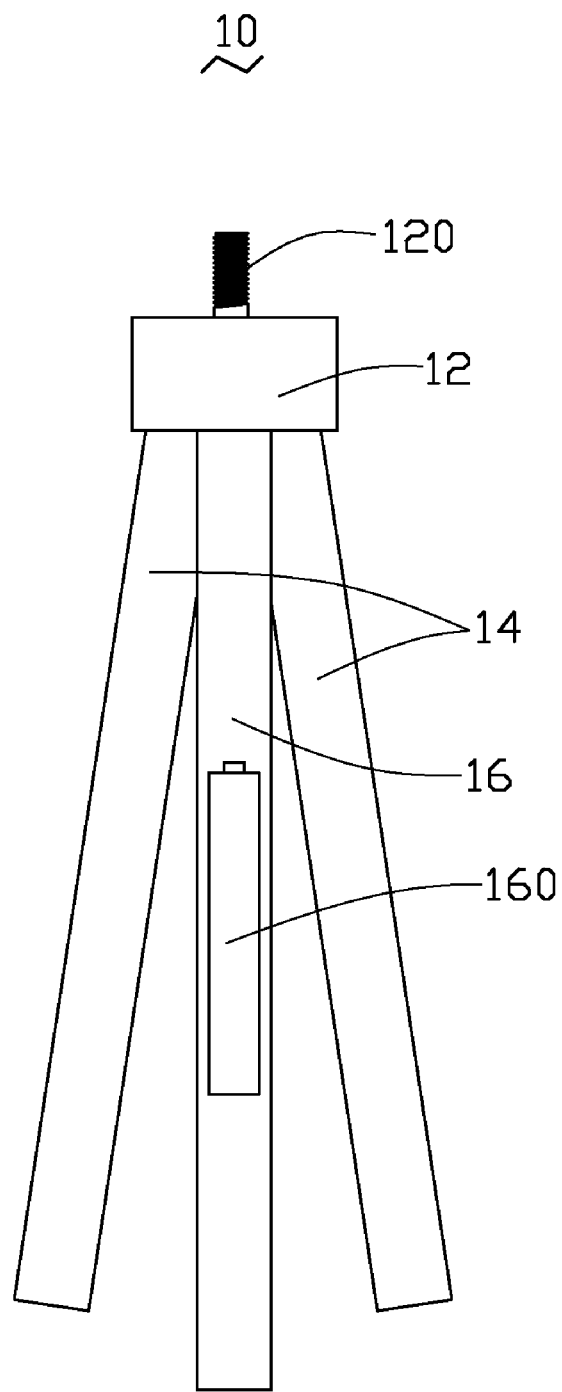
FIG. 3 is a back side view of the tripod in FIG. 1.

Referring to FIG. 2 and FIG. 3, the two first legs 14 and the second leg 16 are elongated, column-shaped and slantwise to each other. Upper ends of the first and second legs 14, 16 are pivotally connected to the central support portion 12 via three hinges (not shown), which can be provided in a bottom of the central support portion 12. The two first legs 14 have a plurality of light-emitting components 140 mounted on one side thereof. The light-emitting components 140 are spaced from each other with a predetermined distance. In the present embodiment, the light-emitting components 140 are light-emitting diodes (LED). When the light-emitting components 140 are powered on, the front area of the tripod 10 is illuminated by light emitted by the light-emitting components 140. The second leg 16 is provided with a battery compartment 160 for receiving batteries therein to provide electric power to the light-emitting components 140.

A switch or a control panel can be provided on the central support portion 12 for controlling light intensity and colors of the light emitted by the light-emitting components 140 to provide the best lighting conditions and visualization effects for taking pictures.

According to the forgoing description, the tripod 10 capable of providing various illumination can not only functions as a temporarily-fixed support for the camera 20 but also as a lighting source to provide the best lighting conditions and visualization effects for taking pictures. Therefore, reduces the amount of supporting equipments that needs to be carried.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A tripod adapted for supporting a camera comprising:
   a discus-shaped central support;
   a fixing post extending upwardly from a center of the central support for supporting the camera; and
   two first legs and a second leg having upper ends pivotally connected to the central support;
   wherein at least one of the two first legs has a plurality of light-emitting components mounted thereon, the second leg has a battery compartment for receiving batteries therein.

2. The tripod as claimed in claim 1, wherein screw threads is formed on a circumference of the fixing post.

* * * * *